Aug. 2, 1927.

B. F. SEYMOUR 1,637,392

COMBINED RESILIENT SUSPENSION AND TRANSMISSION

Filed June 2, 1924     3 Sheets-Sheet 1

Aug. 2, 1927.
B. F. SEYMOUR
1,637,392
COMBINED RESILIENT SUSPENSION AND TRANSMISSION
Filed June 2, 1924  3 Sheets-Sheet 3
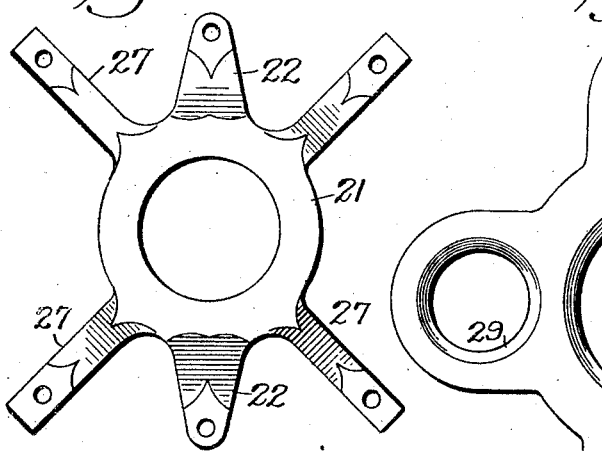
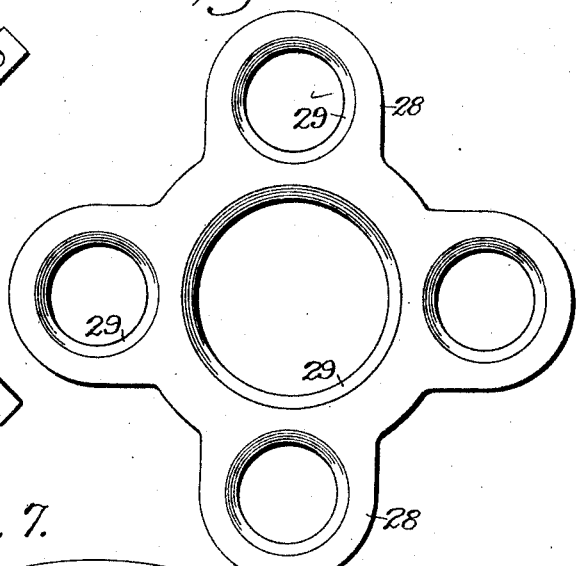
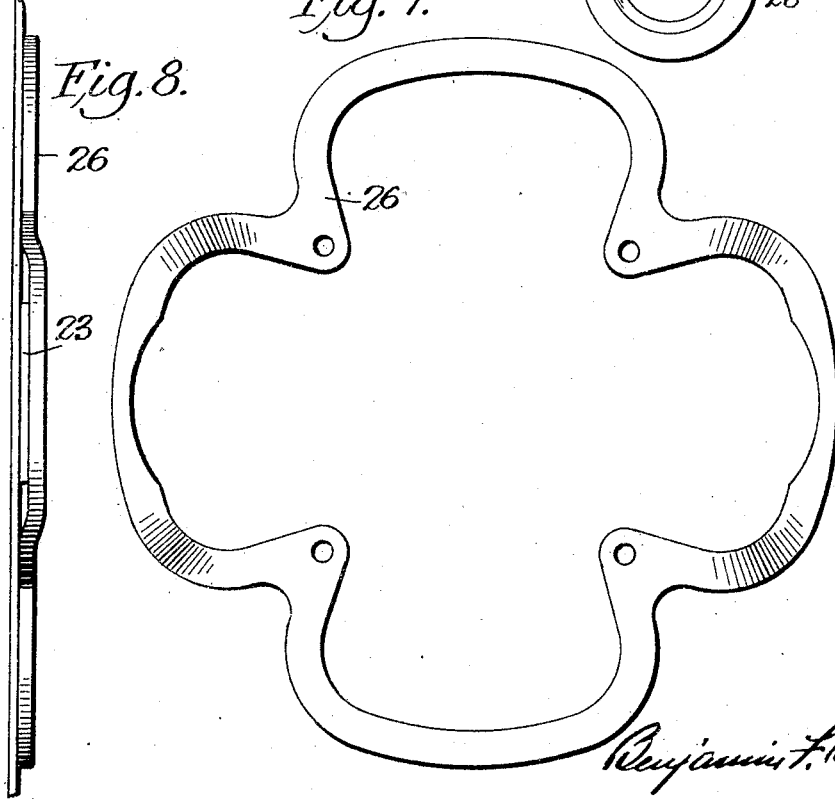

Patented Aug. 2, 1927.

1,637,392

UNITED STATES PATENT OFFICE.

BENJAMIN F. SEYMOUR, OF WASHINGTON, DISTRICT OF COLUMBIA.

COMBINED RESILIENT SUSPENSION AND TRANSMISSION.

Application filed June 2, 1924. Serial No. 717,401.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction shown herein is proposed as an improvement or other embodiment of the types of combined resilient transmission and bearing disclosed in my co-pending application for United States patent bearing the Serial No. 664,632, filed Sept. 24, 1923; and patents numbered 1,462,385, July 17, 1923; 1,462,386, July 17, 1923; 1,477,908, Dec. 18, 1923; 1,477,907, Dec. 18, 1923; 1,477,910, Dec. 18, 1923; 1,474,122 Nov. 13, 1923; 1,477,911, Dec. 18, 1923; 1,477,912, Dec. 18, 1923; 1,476,187, Dec. 4, 1923, 1,525,327, Feb. 3, 1925, and 1,540,189, June 2, 1925; and 1,620,136, Mar. 9, 1927.

The arrangement shown herein is further characterized in that uniformly distributed and co-operable cone elements are provided for the driving and driven element to the end of obtaining equal and uniformly distributed pressure under all working conditions, whereby to obtain maximum efficiency and ease of operation.

The invention is shown by way of illustration in the accompanying drawings wherein:

Figure 5 is a detail view of the spring pressed supporting and driving element;

Figure 6 is a detail view of the spider or bracing element;

Figure 7 is a detail view of the bearing plate or retaining ring; and

Figure 8 is a view at right angles to Fig. 7 further illustrating the configuration of the bearing or retaining ring.

Figure 1:
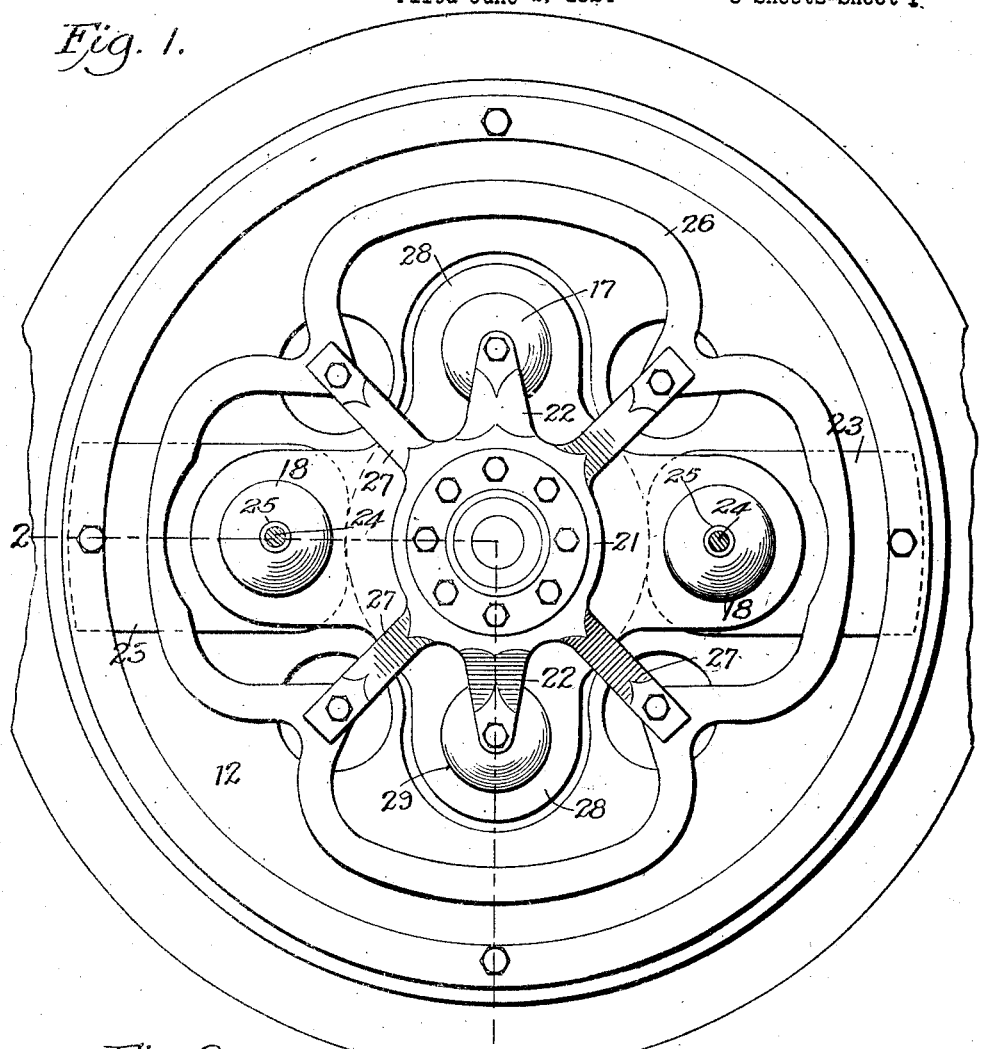
Figure 1 is a front elevational view of a wheel with the outer parts broken away showing the application of the device at the interior of the wheel.

Referring to the construction in further detail and wherein like reference characters designate corresponding parts, the invention comprises a hub 10 having fixed thereto a disk-like side plate 11 at its inner end adjacent the vehicle body; and 12 and 13 designate, respectively, the inner and outer side plates of the wheel rim which have limited movement relative to the wheel hub. The rim plate 12 is disposed in bearing relation against the hub plate 11 (see Fig. 2), and a number of spacing sleeves 14 are located between the rim plates and through which extend bolts 15 for securing the plates together. This plate 12 is centrally apertured, as will be observed by reference to Fig. 3, for the accommodation of wedging elements 17 hereinafter more particularly described.

The resilient transmission and bearing device per se consists of a centrally located cone head 16 fixedly secured on the hub 10 and two pairs of smaller cone heads 17 and 18 secured respectively to the hub side plate 11 and to the reinforcing elements 23 fixed, e. g. by welding, to the side plate 12. The reinforcing elements 23 secured to the side plate 12 serve to strengthen the side plate and more advantageously support the wedging elements 18 carried thereby. The cone elements 17 and 18 are recessed at their larger ends for cooperation with positioning blocks or washers 19 and 20 respectively fixed, e. g., by welding, to the side plate 11 and the reinforcing elements 23 for maintaining the cones in spaced cooperative relation. The cone elements 17 are arranged in diametrically opposed relation and at substantially right angles to similarly carried cone elements 18, each of said cone elements being substantially equidistant from the central frusto-conical hub member 16. The cone elements 17 have their outer ends secured to the legs 22 of a spider or bracing element 21. This spider 21 is threadedly mounted on the hub of the wheel in order that the same may be rotated to vary the adjustment on the parts as will be more particularly described, and said spider is provided with six legs the shorter legs 22 of which overlie the cone members 17 and the other four legs are bolted to the plate 11 but are preferably held spaced therefrom by washers not shown. The cone elements 18 also have their outer ends attached to the outer rim or housing plate 13 which is secured to the opposite rim plate 12 by bolts 24 which pass through spacing collars or washers 25, cone elements 18, and positioning washers or elements 20, thereby inclosing the entire working mechanism of the device.

A clover leaf bearing element or retaining ring 26 designed primarily for maintaining the side plates 11 and 12 in perfect alignment is secured at four points to legs 27 of the spider or bracing element 21 said legs being spaced at substantially ninety degrees apart to properly support said ring.

Figure 2:
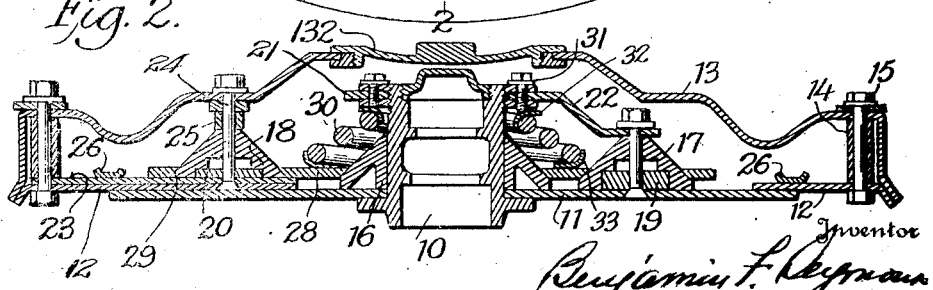
Figure 2 is a transverse sectional view of the wheel complete except for the tire taken on the line 2—2 Fig. 1.
Figure 3:
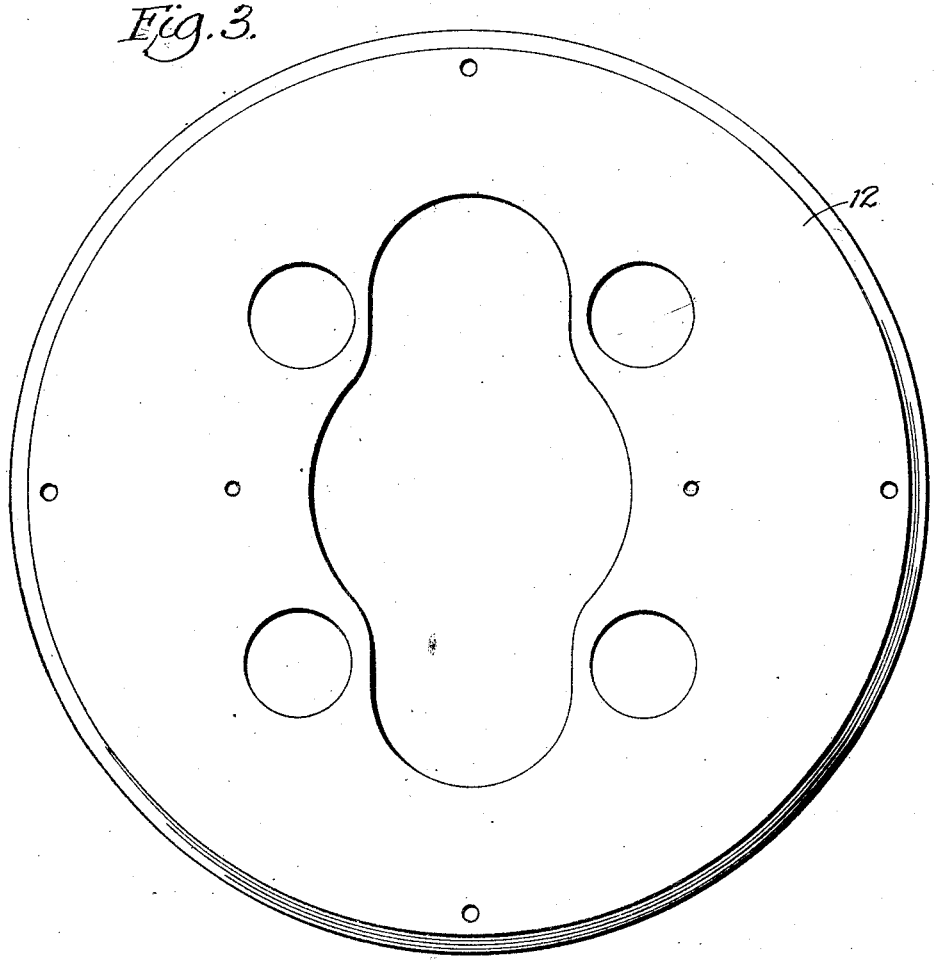
Figure 3 is a detail view of the inner side plate carried by the wheel rim.
Figure 4:
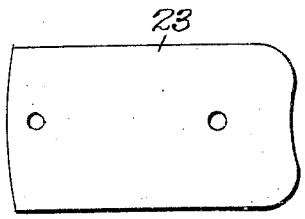
Figure 4 is a detail view of one of the reinforcing elements for the side plate shown in Fig. 3.

The combined supporting and driving element for cooperation with the cone-shaped wedging elements is in the form of a collar 28 as shown in Figure 5 and having a central aperture and four concentric equidistantly spaced smaller apertures. Said apertures have their inner rims beveled at 29 and engage with the surfaces of the wedge members 16, 17, and 18 as shown in Fig. 2.

The combined supporting and driving element 28 is held firmly against the cone elements by means of a spring 30 confined between the member 28 and the spider or bracing element 21 screw threaded on the hub of the wheel. Said spring 30 has its ends provided with collar plates 32 and 33 for an obvious purpose. Adjusting screws 31 are threaded through the spider or bracing element 21 and bear against the collar plate 32 in order to provide additional adjusting means for the spring. Obviously, compression may be given to the spring by screwing home the spider or bracing element 21, and additional independent adjustment may be had by means of the screws 31, for maintaining the parts in proper cooperative relation.

It will therefore be readily understood that the spacing element or collar 28 serves also as a driving means for the wheel hub through the side plate 12 and all its integral parts and that a positive drive is effected through the medium of the five male cone elements and the female transmission or wedge element all of which simultaneously and initially coact to drive the wheel while the hub portion is being supported on the rim portion through the intermediary of the cone elements and the collar 28. Access may be gained to the interior of the wheel for adjusting spider 21 and the screws 31 or other of the parts by removing the plate 13 or by unscrewing the cap 132 carried by said plate.

It will therefore be seen from the foregoing that any motion or shock of the shaft or axle will transmit a like movement to the wheel hub through the medium of the coacting cones, and that such transmission will be flexible or resilient in nature. And it will be further seen that any jarring motion imparted to the wheel will be resiliently taken up by the co-operating cone elements together with the spring.

The invention is not to be understood as being limited to the details of construction herein shown and described, as these may be varied widely without departing from the spirit of the invention.

Having thus described my invention what I claim is:

1. In a combined resilient transmission and bearing for vehicle wheels, the combination of a hub portion, a wheel rim portion, mounted to have relative movement thereon, cooperating bearing plates on said hub and rim portions, wedge elements on said hub and rim portions, and a yieldingly actuated element mounted to have axial and transverse movement on said hub portion and engaging said wedge elements for normally holding said wedge elements in cooperative relation, substantially as set forth.

2. In a combined resilient transmission and bearing for vehicle wheels, the combination of a hub portion and a rim portion mounted to have relative movement thereon, a disk carried by the hub portion, a central cone element fixed to the hub portion, an inner side plate carried by the wheel rim portion and bearing against said disk, cone elements supported on said disk, additional cone elements carried by said inner side plate, an apertured member engaging the cone elements for holding them in cooperative relation, and a spring member co-acting with the apertured member for yieldingly maintaining in position the respective parts, substantially as set forth.

3. In a combined resilient transmission and bearing for vehicle wheels, the combination of a hub portion and a rim portion, a disk carried by the hub portion at its inner end, a central cone element fixed to the hub portion adjacent said disk, an inner side plate carried by the wheel rim portion and bearing against said disk, cone elements supported on said disk, additional cone elements carried by said inner side plate, an apertured member cooperating with the cone elements, and a spring member engaging the apertured member for yieldingly maintaining in position the respective parts, substantially as set forth.

4. In a combined resilient transmission and bearing for vehicle wheels, the combination of a hub portion and a rim portion, a disk carried by the hub portion at its inner end, a central cone element fixed to the hub portion adjacent said disk, an inner side plate carried by the wheel rim portion and bearing against said disk, diametrically opposed cone elements supported on said disk, additional diametrically opposed cone elements arranged substantially at right angles to said first-mentioned cone elements and carried by said inner side plate, an apertured member cooperating with the cone elements, and a spring member engaging the apertured member for yieldingly maintaining in position the respective parts, substantially as set forth.

5. In a combined resilient transmission and bearing for vehicle wheels, the combination of a hub portion and a rim portion, a disk carried by the hub portion at its inner end, a central cone element fixed to the hub portion adjacent said disk, an inner side plate carried by the wheel rim portion and bearing against said disk, diametrically opposed cone elements supported on said disk, additional diametrically opposed cone elements arranged substantially at right angles to said first-mentioned cone elements and carried by said inner side plate, a bearing element carried in bearing relation against the inner side plate, an apertured member cooperating with the cone elements, and a spring member engaging the apertured member for yieldingly maintaining in position the respective parts, substantially as set forth.

6. In a combined resilient transmission and bearing for vehicle wheels, a hub portion and a rim portion, a disk carried by the hub portion at its inner end, a central cone element fixed to the hub portion adjacent said disk, an inner side plate carried by the wheel rim portion and bearing against said disk, diametrically opposed cone elements supported on said disk, additional diametrically opposed cone elements arranged substantially at right angles to said first-mentioned cone elements and carried by said inner side plate, a spider adjustably carried at the outer end of the hub portion and having opposed legs connected to the cone elements on the disk, a bearing element secured to the other legs of the spider and bearing against the inner side plate, an apertured member cooperating with the cone elements, and a spring member confined between the apertured member and the adjustable spider said spider providing means for varying the compression of the spring, substantially as set forth.

7. In a combined resilient transmission and bearing for vehicle wheels, a hub portion and a rim portion, a disk fixed to said hub portion adjacent its inner end, a cone element fixed to the hub portion adjacent said disk, an inner side plate carried by said rim portion and bearing against said disk, diametrically opposed cone elements supported on said disk, additional diametrically opposed cone elements arranged substantially at right angles to the said first-mentioned cone elements and carried by said inner side plate, an outer side plate carried by said rim portion and connected to the cone elements carried by the inner side plate, a spider adjustably carried at the outer end of the hub portion and having legs connected to the cone elements on the disk, a bearing element secured to the other legs of the spider and bearing against the inner side plate, an apertured member cooperating with the cone elements, and a spring member confined between the apertured member and the adjustable spider said spider providing means for varying the compression of the spring, substantially as set forth.

8. In a combined resilient transmission and bearing for vehicle wheels, a hub portion, a bearing disk fixed to said hub portion adjacent its inner end, a cone element fixed to the hub portion adjacent said disk, a rim portion, an inner side plate carried by said rim portion and bearing against the disk on the hub portion, diametrically opposed cone elements supported on said disk, additional diametrically opposed cone elements arranged substantially at right angles to said first-mentioned cone elements and carried by said inner side plate, an outer side plate carried by said rim portion and connected to the cone elements carried by the inner side plate, a spider adjustably carried at the outer end of the hub portion and having opposed legs connected to the cone elements on the disk, a substantially annular bearing element secured to the other legs of the spider and bearing against the inner side plate, an apertured member cooperating with the cone elements, and a spring member confined between the apertured member and the adjustable spider, said spider providing means for varying the compression of the spring, substantially as set forth.

9. In a combined resilient transmission and bearing for vehicle wheels, a hub portion, a disk-like element fixed to said hub portion adjacent its inner end, a central cone-shaped bearing element fixed to the hub portion adjacent said disk-like element, a rim portion, an inner side plate carried by said rim portion and bearing against the disk-like element on the hub portions, diametrically opposed cone-shaped bearing elements supported on said disk-like element, additional diametrically opposed cone-shaped bearing elements arranged substantially at right angles to the first-mentioned cone elements and carried by said inner side plate, an outer side plate carried by said rim portion and connected to the cone-shaped bearing elements carried by the inner side plate, a spider adjustable axially of the hub portion carried at the outer end thereof and having opposed legs connected to the cone-shaped bearing elements on the disk-like element, a bearing element secured to the other legs of the spider and bearing against the inner side plate, an apertured member cooperating with the cone-shaped bearing elements, and a spring member confined between the apertured member and the adjustable spider, said spider providing means for varying the compression of the spring, substantially as set forth.

10. In a combined resilient transmission and bearing for vehicle wheels, a hub portion, a disk-like element fixed to said hub portion adjacent its inner end, a frusto-conical hub member constituting a central cone-shaped bearing element fixed to the hub portion adjacent said disk-like element, a rim portion, an inner centrally apertured side plate carried by said rim portion and bearing against the disk-like element on the hub portion, diametrically opposed cone-shaped bearing elements supported on said disk-like element within the aperture in the side plate, additional diametrically opposed cone-shaped bearing elements arranged substantially at right angles to the first-mentioned cone elements and carried by said inner side plate, an outer side plate carried by said rim portion and connected to the cone-shaped bearing elements carried by the inner side plate, a spider adjustably carried at the outer end of the hub portion and having opposed legs connected to the cone-shaped bearing elements on the disk-like element, a bearing element secured to the other legs of the spider and bearing against the inner side plate, an apertured member cooperating with the cone-shaped bearing elements, and a spring member confined between the apertured member and the adjustable spider, said spider providing means for varying the compression of the spring, substantially as set forth.

11. In a combined resilient transmission and bearing for vehicle wheels, the combination of a hub portion, a wheel rim portion mounted to have relative movement thereon, cooperating bearing plates on the hub and rim portions, wedge elements on the hub and rim portions respectively, a retaining ring adapted to hold the bearing plates in alinement, and a yieldingly actuated element mounted to have axial and transverse movement on the hub portion and engaging the wedge elements for normally holding the wedge elements in cooperative relation, substantially as set forth.

12. In a combined resilient transmission and bearing for vehicle wheels, the combination of a hub portion, a wheel rim portion mounted to have relative movement thereon, cooperating bearing plates on the hub and rim portions, wedge elements on the hub and rim portions respectively, a retaining ring adapted to hold the bearing plates in alinement, said ring having fixed connection with the hub portion, and a yieldingly actuated element mounted to have axial and transverse movement on the hub portion and engaging the wedge elements in cooperative relation, substantially as set forth.

In witness whereof, I have hereunto set my hand at Green Bay, Wisconsin, this 15th day of May, A. D. nineteen hundred and twenty-four.

BENJAMIN F. SEYMOUR.